: 2,743,299
Patented Apr. 24, 1956

2,743,299

PRODUCTION OF TETRAKIS(HYDROXYMETHYL) PHOSPHONIUM CHLORIDE

Francis F. Flynn, Wilson A. Reeves, and John D. Guthrie, New Orleans, La., assignors to the United States of America as represented by the Secretary of Agriculture No Drawing. Application June 12, 1953,
Serial No. 361,444

2 Claims. (Cl. 260—606.5)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to an improved process of producing tetrakis(hydroxymethyl) phosphonium chloride, hereinafter referred to by the initials THPC. THPC is a valuable, polyfunctional compound which is an intermediate for the production of numerous compounds and compositions.

THPC was heretofore prepared by reacting phosphine with a quiescent body of an aqueous solution of formaldehyde and hydrochloric acid in a mole ratio of 4.0 to 1.6 at a temperature of 80° C. In that process it takes about 8 hours for 100 parts of the formaldehyde solution to absorb and react with the phosphine generated from 30 parts of aluminum phosphide, and the phosphine often ignites causing explosions. The reaction temperature of 80° C. was heretofore believed to be the only temperature at which the reaction could be conducted; on the theory that at a lower temperature, the rate of reaction would be too low, and at a higher temperature, the vapor pressure of the formaldehyde solution would inhibit the absorption of the phosphine, J. Am. Chem. Soc. 43 1684–8, 1921.

A primary object of the present invention is to provide a process of producing THPC which can be operated at normal room temperature, which is free of an explosion hazard, and which can feasibly be conducted on a commercial scale.

In general, in accordance with the present invention, THPC is produced by reacting phosphine with an agitated aqueous solution of formaldehyde and hydrochloric acid, containing from about 4 to 6 moles of formaldehyde per mole of hydrochloric acid, at a temperature of from about 10 to 30° C.

Unobviously, in a reaction conducted in accordance with this invention, the rate of THPC production appears to be limited only by the amount of reactants used, and there is no tendency for the phosphine to explode. For example, 100 parts of the formaldehyde solution can readily be caused to absorb and react with the phosphine generated from 30 parts of aluminum phosphide in less than one hour in a reaction which proceeds at a uniform and controllable rate.

The phosphine used in the reaction can suitably be moist or anhydrous. The reaction of aluminum phosphide with water is one suitable method of producing the phosphine used.

The reaction can suitably be conducted in a batchwise or continuous manner at pressures above or below normal atmospheric pressure. The use of pressure slightly above normal atmospheric pressure is preferred.

The aqueous solution of formaldehyde and hydrochloric acid can suitably be prepared by dissolving the individual compounds in water or by dissolving materials capable of producing formaldehyde and hydrochloric acid in water. The dissolving of formaldehyde or the polymers thereof, such as paraformaldehyde, in aqueous hydrochloric acid is preferred. A ratio of from about 4.2 to 4.7 moles of formaldehyde per mole of hydrochloric acid is preferred.

The aqueous formaldehyde solution can suitably be agitated by any of the conventional procedures for agitating a liquid in contact with a gas. Agitating a column of the liquid with mechanical stirrers while introducing the gas at the bottom of the column, or the countercurrent washing of a rising stream of the gas with the liquid, is preferred. Unobviously, with vigorous agitation, substantially all of the phosphine is absorbed and reacted, and the escape of phosphine from the reaction vessel does not introduce a serious hazard.

Wetting and/or emulsifying agents which are inert to the reactants and to THPC can suitably be incorporated in the aqueous formaldehyde solution where desired.

The following examples are illustrative of details of the invention;

Example 1

Phosphine was produced by reacting crude aluminum phosphide with water. The crude aluminum phosphide was prepared by burning a mixture of 528 parts powdered aluminum and 352 parts red phosphorus.

A solution of 2120 parts aqueous 37% formaldehyde and 665 parts by wt. of aqueous 35% hydrochloric acid was agitated with mechanical stirrers in a cylindrical vessel in which the depth of the liquid was about 6.5 inches.

Two phosphine generators comprising filter flasks fitted with inlet tubes, water sealed pressure release tubes, and outlet tubes fitted with liquid traps, were connected to supply gas to the bottom of the column of the aqueous formaldehyde solution, through gas dispersing filter tubes.

Prior to the generation of phosphine, the apparatus was swept free of air by a stream of nitrogen.

The phosphine generated from 880 parts crude aluminum phosphide, by reacting 15 part portions of the aluminum phosphide in each phosphine generator each successive hour, was passed into the formaldehyde solution.

Two hours after the last portion of aluminum phosphide had reacted, the reaction vessel contained a clear solution. The components of the solution which were volatile at 70 to 75° C. were distilled off under atmospheric pressure. Upon cooling, crystals formed, and 1135 parts of dry THPC was recovered. The THPC was colorless and melted at 147° C. to 148° C.

Example 2

Example 1 was repeated using a formaldehyde-hydrochloric acid solution prepared by mixing 780 parts paraformaldehyde with 680 parts aqueous 35% hydrochloric acid and 1100 parts water.

The reaction produced 1130 parts of THPC of a similar quality.

We claim:
1. A process of producing tetrakis(hydroxymethyl) phosphonium chloride, comprising, reacting phosphine with an agitated aqueous solution of formaldehyde and hydrochloric acid, containing from about 4 to 6 moles of formaldehyde per mole of hydrochloric acid, at a temperature of from about 10° C. to 30° C.

2. The process of claim 1 in which the formaldehyde and hydrochloric acid are present in a mole ratio of from about 4.2 to 4.7 moles of formaldehyde per mole of hydrochloric acid, and the reaction is conducted at from about 20° to 30° C.

References Cited in the file of this patent

Messinger: Ber. 21, 326, 2919 (1888).
Hoffman: J. A. C. S. 43, 1684–8 (1921).